(12) United States Patent
Joe et al.

(10) Patent No.: US 10,116,729 B2
(45) Date of Patent: Oct. 30, 2018

(54) DYNAMIC MEDIA TRANSFORMATION SERVICE IN A CDN

(71) Applicant: Verizon Patent and Licensing Inc., Arlington, VA (US)

(72) Inventors: Brian W. Joe, Irvine, CA (US); Hayes Kim, Porter Ranch, CA (US); Derek Shiell, Los Angeles, CA (US)

(73) Assignee: VERIZON DIGITAL MEDIA SERVICES INC., Dulles, VA (US)

( * ) Notice: Subject to any disclaimer, the term of this patent is extended or adjusted under 35 U.S.C. 154(b) by 214 days.

(21) Appl. No.: 14/876,168

(22) Filed: Oct. 6, 2015

(65) Prior Publication Data

US 2017/0099341 A1    Apr. 6, 2017

(51) Int. Cl.
*H04L 29/08* (2006.01)
(52) U.S. Cl.
CPC .............. *H04L 67/06* (2013.01); *H04L 67/02* (2013.01)
(58) Field of Classification Search
None
See application file for complete search history.

(56) References Cited

U.S. PATENT DOCUMENTS 9,641,565 B2 *    5/2017    Boudreau ............... H04L 65/40
9,661,106 B2 *    5/2017    Krieger ................... H04L 67/42

\* cited by examiner

*Primary Examiner* — Jeffrey R Swearingen
(74) *Attorney, Agent, or Firm* — Ansari Katiraei LLP; Arman Katiraei; Sadiq Ansari

(57) ABSTRACT

A network device receives, from a customer, a customer subscription to a media transformation service; receives, from the customer as a first component of the subscription, data associated with customer media; and receives, from the customer as a second component of the subscription, one or more customer-selected parameters that specify media transformations to be performed upon the customer media. The network device receives, from a client browser, a request for the customer media, and transforms, responsive to receipt of the request from the client browser, the customer media based on the one or more customer-selected parameters to produce a transformed version of the customer media. The network device sends the transformed version of the customer media, via a content delivery network, to the client browser.

20 Claims, 14 Drawing Sheets

| Tiers of Service | Images Served /month | Data Transfer /month | Storage /month | Setup Fee | Monthly Fee | Add Domains /mo |
|---|---|---|---|---|---|---|
| Tier 1 | 200k | 5GB | 2GB | $3,000 | $1,000 | $0 |
| Tier 2 | 500k | 10GB | 5GB | $6,000 | $2,000 | $0 |
| Tier 3 | 1.5M | 25GB | 5GB | $10,000 | $4,000 | $0 |
| Tier 4 | 4M | 100GB | 10GB | $16,000 | $8,000 | $0 |
| Tier 5 | 10M | 200GB | 20GB | $26,000 | $13,000 | $0 |
| Tier 6 | 25M | 400GB | 40GB | $44,000 | $22,000 | $0 |
| Tier 7 | 50M | 800GB | 80GB | $70,000 | $35,000 | $0 |

Overages:

| Overage Fee | $ / Image | Data Transfer Per/GB | Disk Storage Per/GB |
|---|---|---|---|
| Tier 1 | 0.00150 | $50 | $10 |
| Tier 2 | 0.00100 | $50 | $10 |
| Tier 3 | 0.00080 | $50 | $10 |
| Tier 4 | 0.00060 | $50 | $10 |
| Tier 5 | 0.00054 | $50 | $10 |
| Tier 6 | 0.00039 | $50 | $10 |
| Tier 7 | 0.00036 | $50 | $10 |

ADVANCED Tiers of Service

FIG. 7

DYNAMIC MEDIA TRANSFORMATION SERVICE IN A CDN

BACKGROUND

A content delivery network includes a large distributed system of servers deployed in multiple data centers across the Internet. The content delivery network serves content, including different types of media, to end users with a high level of performance. The content delivery network serves, for example, web objects (text, graphics and/or scripts), downloadable objects (images, audio media, video media, software, and/or documents), applications, and live streaming media (e.g., Hypertext Transfer Protocol (HTTP) Live Streaming (HLS) media). Content delivery network nodes are typically deployed in multiple locations, often over multiple backbones. The benefits of a content delivery network include reduction of bandwidth costs, improving web page load times, and increasing the availability of content.

HLS is a HTTP-based media streaming communications protocol that involves breaking the media stream into a sequence of file downloads. Each file may be downloaded as one portion of a transport stream. Each downloaded file may be played in sequence to present a continuous media stream. As a given stream is played, the client may choose from multiple different alternative streams containing the same content encoded at various data rates. At the beginning of a streaming session, the client downloads a playlist file that specifies the different or alternate streams that are available. In HLS, a given multimedia presentation is specified by a Uniform Resource Identifier (URI) to the playlist file, which itself consists of an ordered list of media URIs and informational tags. Each media URI refers to a media file that is a segment of a single continuous media stream. To play a stream, a client first obtains the playlist file and then obtains and plays each media file in the playlist in sequence.

BRIEF DESCRIPTION OF THE DRAWINGS

FIGS. 5-7 and 9 are diagrams that depict exemplary user interfaces that may be used in conjunction with the exemplary process of FIG. 4;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement a media transformation service that permits subscribing customer web servers to have their media transformed, by a web acceleration server located in the content delivery network, when the media is served to requesting client devices. The media may include image, audio, video, and/or audio/video media, and the media may, for example, be contained within web documents hosted by the customer web servers. The customers associated with the web servers may select specific transformations to be performed upon the media, and when the media is to be served to a client device during, for example, delivery of the customer's webpage to the client device, the web acceleration server in the content delivery network performs the transformations of the media, and provides a transformed version of the media to the client device. The media transformations included in the media transformation service may include, for example, pixel dimension re-sizing, image zooming, manipulating color, inserting banners/overlays/watermarks, rendering textures, compressing media data, and/or optimizing the media for delivery to certain types of destination devices.

Figure 1:
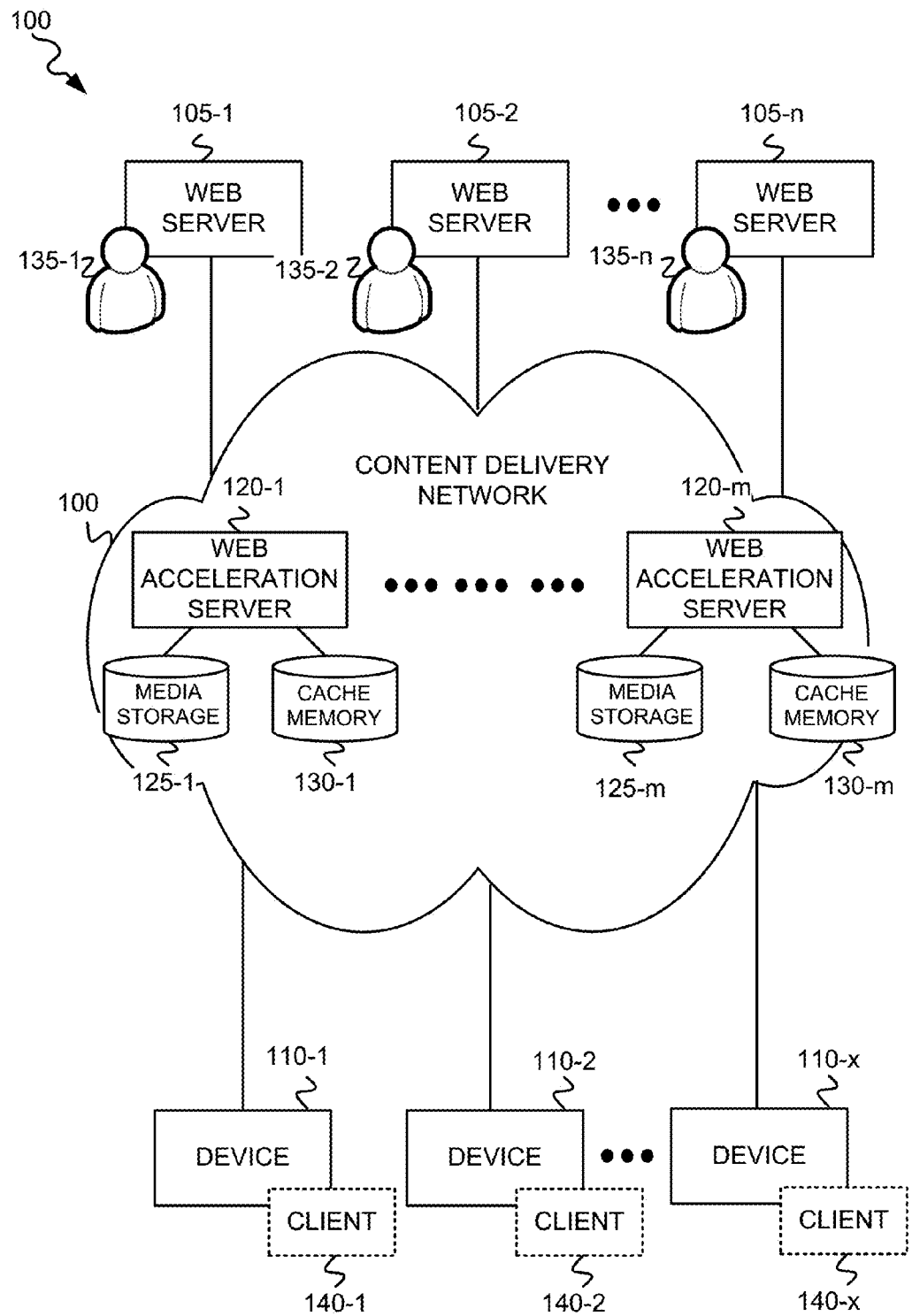
FIG. 1 illustrates an exemplary network environment in which a media transformation service may be implemented for transforming customer media using customer-specified media transformation parameters.

FIG. 1 illustrates an exemplary network environment 100 in which a media transformation service, described herein, may be implemented for transforming customer media using customer-specified media transformation parameters. Network environment 100 includes a content delivery network (CDN) 100, multiple web servers 105-1 through 105-*n* (where n is a positive integer greater than one), and multiple devices 110-1 through 110-*x* (where x is a positive integer greater than one).

CDN 100 may include one or more networks including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). In addition to many different types of network nodes (e.g., routers, gateways, switches, etc.), CDN 100 may, as shown in FIG. 1, include one or more web acceleration servers 120-1 through 120-*m* (where m is a positive integer greater than or equal to one). Web acceleration servers 120-1 through 120-*m* (generically referred to herein as "web acceleration server 120" or "web acceleration servers 120") may each include a network device, connected to one or more other nodes within CDN 100, that may be located in distributed locations in CDN 100, or in one or more groups of servers within CDN 100.

CDN 100 may further include media storage units 125-1 through 125-*m* (generically referred to herein as "media storage 125"), and cache memory units 130-1 through 130-$m$ (generically referred to herein as "cache memory 130"), with each media storage 125 and cache memory 130 being associated with a respective web acceleration server 120 (e.g., media storage 125-1 and cache memory 130-1 associated with web acceleration server 120-1, media storage 125-2 and cache memory 130-2 associated with web acceleration server 120-2, etc.). Web acceleration servers 120 may, in addition to the media transformation described herein, use web acceleration techniques to speed up the transfer of content between web servers 105 and devices 110. Such web acceleration techniques may include, for example, using a load balancer to optimize traffic as it flows between web servers 105 and devices 110, locally caching commonly requested data, pre-fetching, and locally caching certain data. Web acceleration servers 120, as described herein, receive customer-selected media transformation parameters from customers 135, and when corresponding media is requested by devices 110, web acceleration servers 120 retrieve the customer-selected media transformation parameters, perform media transformations upon the requested customer media as indicated by the customer-selected media transformation parameters, and provide a transformed version of the customer media to the requesting devices 110.

Web servers 105 may host web documents (e.g., Hypertext Markup Language (HTML) webpages), and/or media, and may retrieve and send the web documents and/or media to devices 110 upon request. The media may include, for example, images, audio media, video media, and/or audio/video media. The media may be a component of a web document (e.g., image within the web document), or may be "stand alone" media (e.g., streamed media accessible via "clicking" on a URL within the document). The video or audio/video media may include live streaming media (e.g., HLS media). CDN 100 may carry web documents and/or media from web servers 105 to devices 110, or from web acceleration servers 120 to devices 110, as described in further detail below.

Web servers 105-1 through 105-$n$ may be associated with respective customers 135-1 through 135-$n$ (generically referred to herein as "customer 135" or "customers 135"). For example, as shown in FIG. 1, customer 135-1 is associated with web server 105-1, customer 135-2 is associated with web server 105-2, etc. Each customer 135 may include a web server operator, web server administrator, or other individual or group of individuals responsible for a respective web server 105 that stores web documents and/or media. Each customer 135 may subscribe to a media transformation service, as described herein, and may select a certain class and tier of the media transformation service for transforming media hosted by a respective web server 105, and/or contained in documents hosted by a respective web server 105.

Devices 110-1 through 110-$x$ (generically referred to herein as "device 110" or "devices 110") may execute respective clients 140-1 through 140-$x$ (generically referred to herein as "client 140" or "clients 140"), where each client 140 includes an application (e.g., a web browser) for accessing documents and/or media at web servers 105. Devices 110 may include any type of digital computing device that has a capability to communicate with web servers 105 via CDN 100. Devices 110 may include, for example, a cellular telephone (e.g., smart phone); a laptop, desktop, palmtop or tablet computer; a set-top box (STB); a wearable computer device (e.g., a wrist watch, glasses, etc.); a media playing device; a game playing device; a digital camera device; or a personal digital assistant (PDA).

The configuration of the components of network environment 100 depicted in FIG. 1 is for illustrative purposes only, and other configurations may be implemented. Therefore, network environment 100 may include additional, fewer and/or different components, that may be configured differently, than depicted in FIG. 1. For example, though multiple different media storage units 125 and cache memory units 130 are depicted in FIG. 1, all such storage units 125 and cache memory units 130 may be reside in CDN 100 as a single media storage unit 125 or single cache memory 130 that is accessed by one or more web acceleration servers 120.

Figure 2:
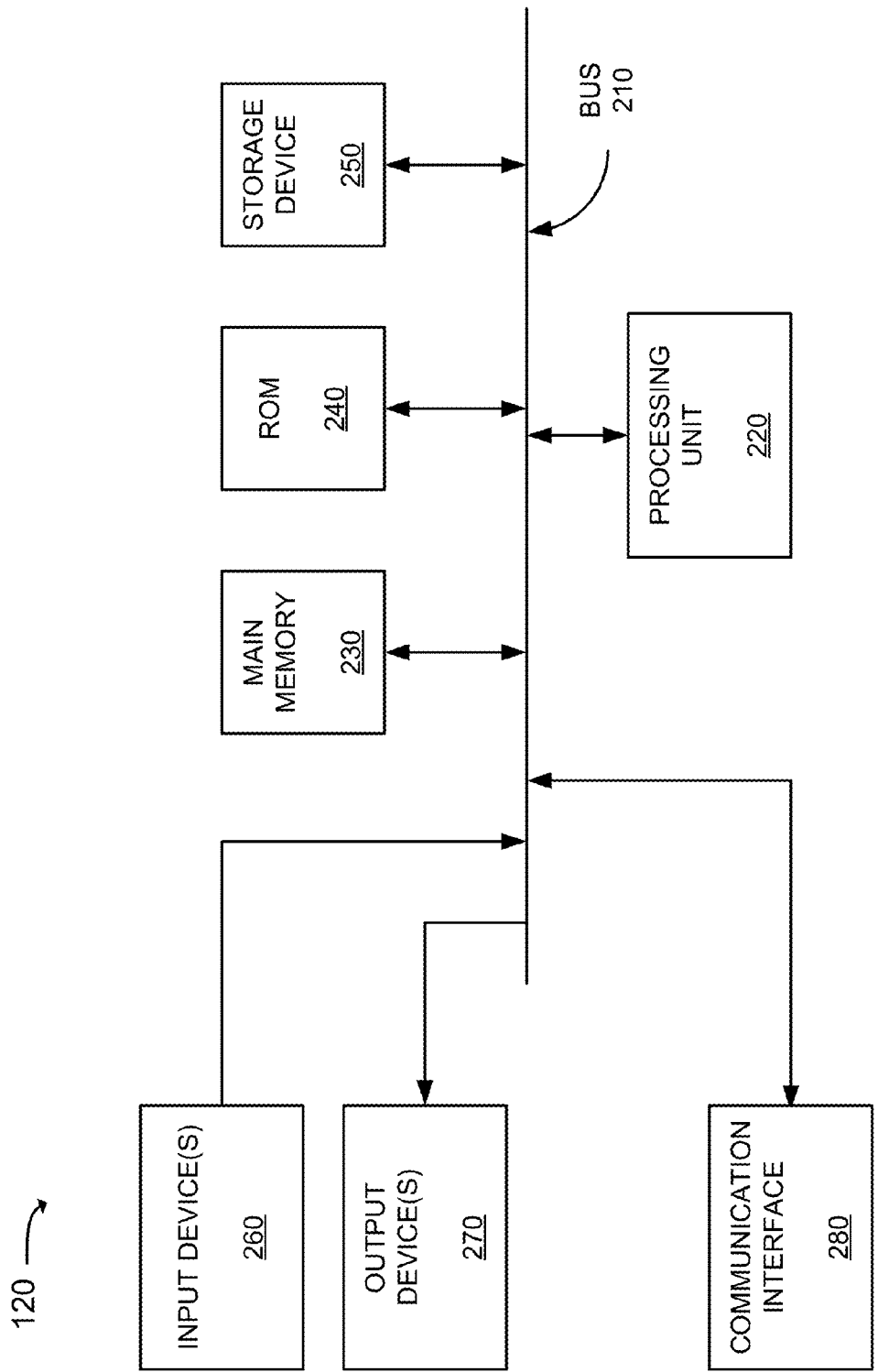
FIG. 2 is a diagram that depicts exemplary components of a web acceleration server of the exemplary network environment of FIG. 1.

FIG. 2 is a diagram that depicts exemplary components of a web acceleration server 120. Web servers 105, media storage units 125, cache memory units 130, and devices 110 may each be configured similarly to web acceleration server 120 shown in FIG. 2.

Web acceleration server 120 may include a bus 210, a processing unit 220, a main memory 230, a read only memory (ROM) 240, a storage device 250, an input device(s) 260, an output device(s) 270, and a communication interface(s) 280. Bus 210 may include a path that permits communication among the components of web acceleration server 120.

Processing unit 220 may include one or more processors or microprocessors, or processing logic, which may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium. Main memory 230, ROM 240 and storage device 250 may each be referred to herein as a "tangible non-transitory computer-readable medium."

Input device 260 may include one or more mechanisms that permit an operator to input information to web acceleration server 120, such as, for example, a keypad or a keyboard, a display with a touch sensitive panel, voice recognition and/or biometric mechanisms, etc. Output device 270 may include one or more mechanisms that output information to the operator, including a display, a speaker, etc. Input device 260 and output device 270 may, in some implementations, be implemented as a user interface (UI) that displays UI information and which receives user input via the UI. Communication interface(s) 280 may include a transceiver that enables web acceleration server 120 to communicate with other devices and/or systems. For example, communication interface(s) 280 may include wired or wireless transceivers for communicating via CDN 100.

The configuration of components of web acceleration server 120 shown in FIG. 2 is for illustrative purposes. Other configurations may be implemented. Therefore, web acceleration server 120 may include additional, fewer and/or different components, arranged in a different configuration, than depicted in FIG. 2.

Figure 3:
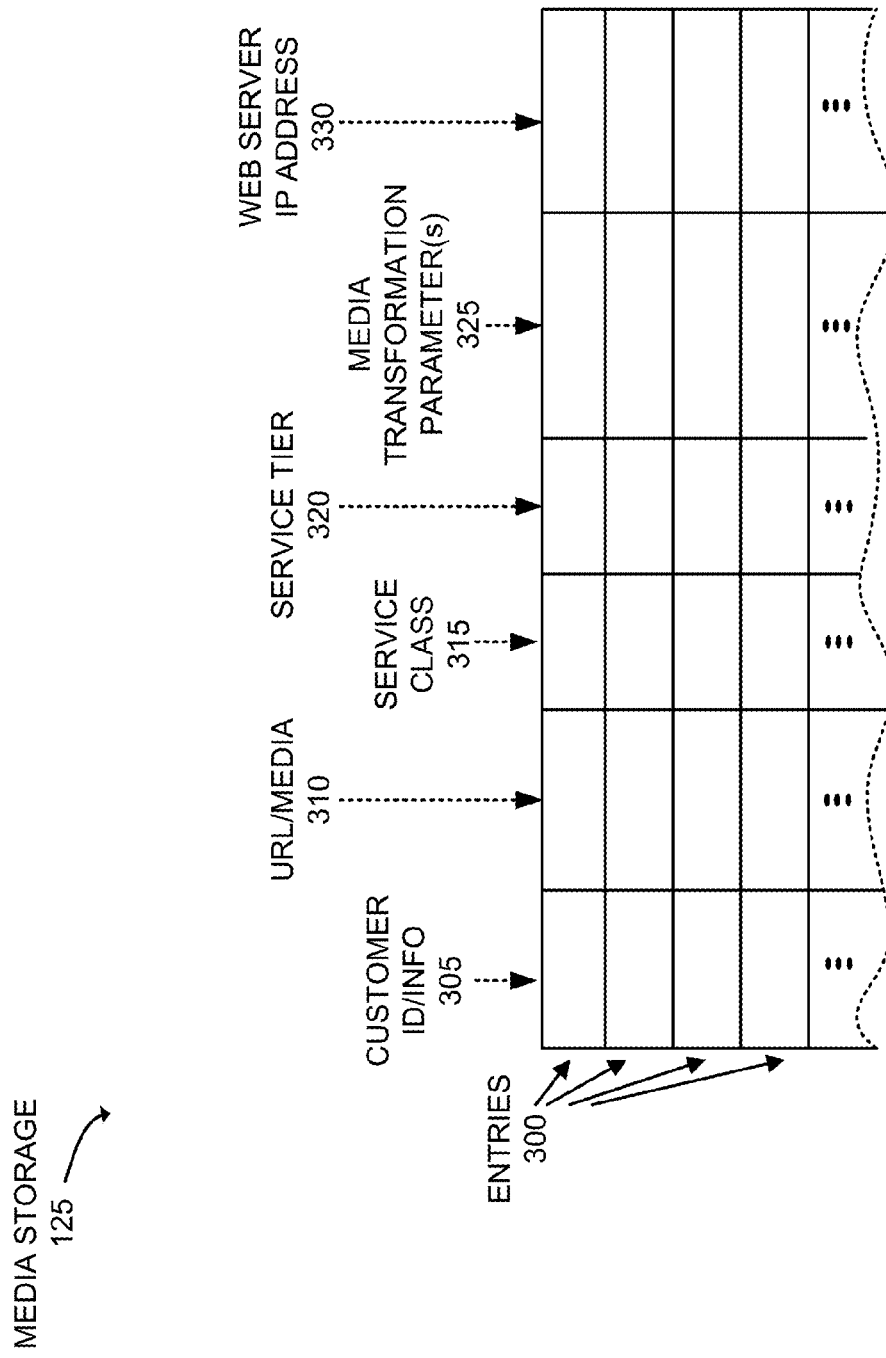
FIG. 3 is a diagram that depicts a data structure associated with a media storage unit of the exemplary network environment of FIG. 1.

FIG. 3 is a diagram that depicts a data structure associated with a media storage unit 125. As shown, the data structure of media storage unit 125 may include multiple entries 300, with each entry 300 including a customer identification (ID)/information field 305, a Uniform Resource Location (URL)/media field 310, a service class field 315, a service tier field 320, a media transformation parameter(s) field 325, and a web server Internet Protocol (IP) address field 330.

Customer ID/information field 305 stores data associated with a respective customer 135, including a unique customer ID, and other information associated with the customer, such as, for example, a postal address, a telephone number, an email address, and billing information (e.g., credit card information, on-line payment service information, such as Paypal, etc.). URL/media field 310 stores one or more URLs that include a link(s) to stored media that is stored at a web server 105, or other storage location(s), or stores the actual media itself.

Service class field 315 stores data that indicates a specific service class of the media transformation service to which the customer, identified in customer ID field 305, has subscribed. The service classes may include, for example, a "basic" and an "advanced" service class, though other types of service classes may be offered within the media transformation service. Each different service class may include a different set of media transformations that may be performed within that service class. For example, the "basic" service class may include image resizing (changing pixel dimensions), image zooming, color manipulation, and media data compression; and the "advanced" service class may include the media transformations of the "basic" service class plus insertion of banners/overlays/watermarks in media, texture rendering, and optimization of the media for specific destination devices.

Figure 6:
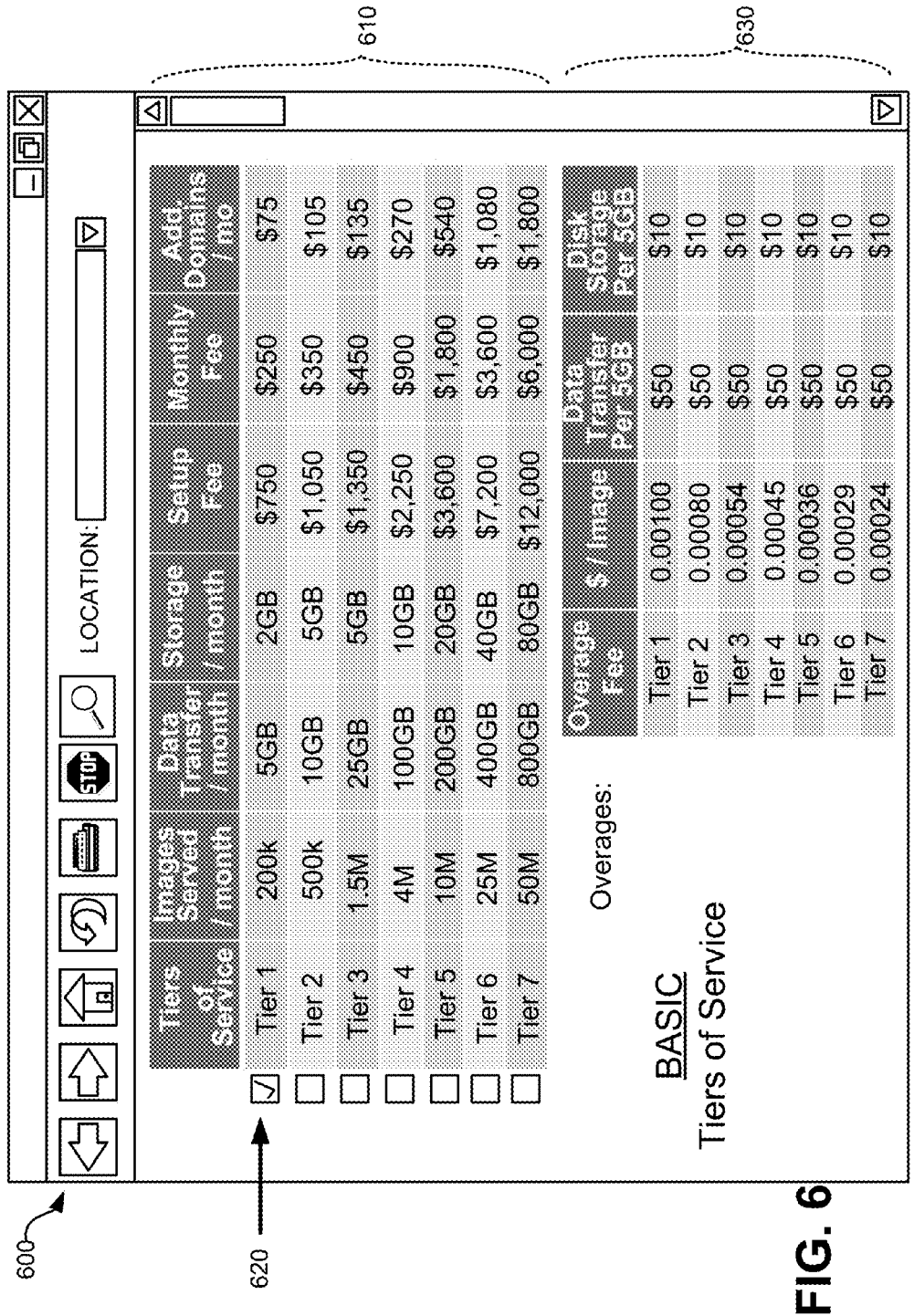

Service tier field 320 stores data that indicates a particular service tier, within the service class identified in field 315, to which the customer, identified in customer ID field 305, has subscribed. Multiple tiers (e.g., "tier 1" through "tier 7") may exist within each service class, where each of the tiers permits a maximum number of media transformations per month, a maximum amount of data transfer per month, and a maximum amount of data storage per month. A different setup fee and/or monthly fee may be associated with each of the multiple service tiers. Service tiers are described in further detail below with respect to FIGS. 6 and 7.

Media transformation parameter(s) field 325 stores data that indicates one or more customer-selected parameters which specify media transformations to be applied to the media identified, or stored in, URL/media field 310. When web acceleration server 120 is to perform media transformations upon particular customer media, web acceleration server 120 retrieves the customer-selected parameters from field 325, and performs the media transformations in accordance with the retrieved parameters. Web server IP address field 330 stores an IP address assigned to the web server 105 associated with the customer identified in field 305.

The data structure of media storage unit 125 is depicted in FIG. 3 as a tabular data structure with a certain number of fields having a certain content. The tabular data structure of media storage unit 125 show in FIG. 3, however, is for illustrative purposes. Other types of data structures may alternatively be used. The number, types, and content of the entries and/or fields in the data structure of media storage unit 125 illustrated in FIG. 3 is also for illustrative purposes. Other data structures having different numbers of, types of and/or content of, the entries and/or the fields may be implemented. Therefore, media storage 125 may include additional, fewer and/or different entries and/or fields than those depicted in FIG. 3. For example, each entry 300 may include an additional field that stores a unique identifier associated with the media identified, or stored in, URL/media field 310.

Figure 4:
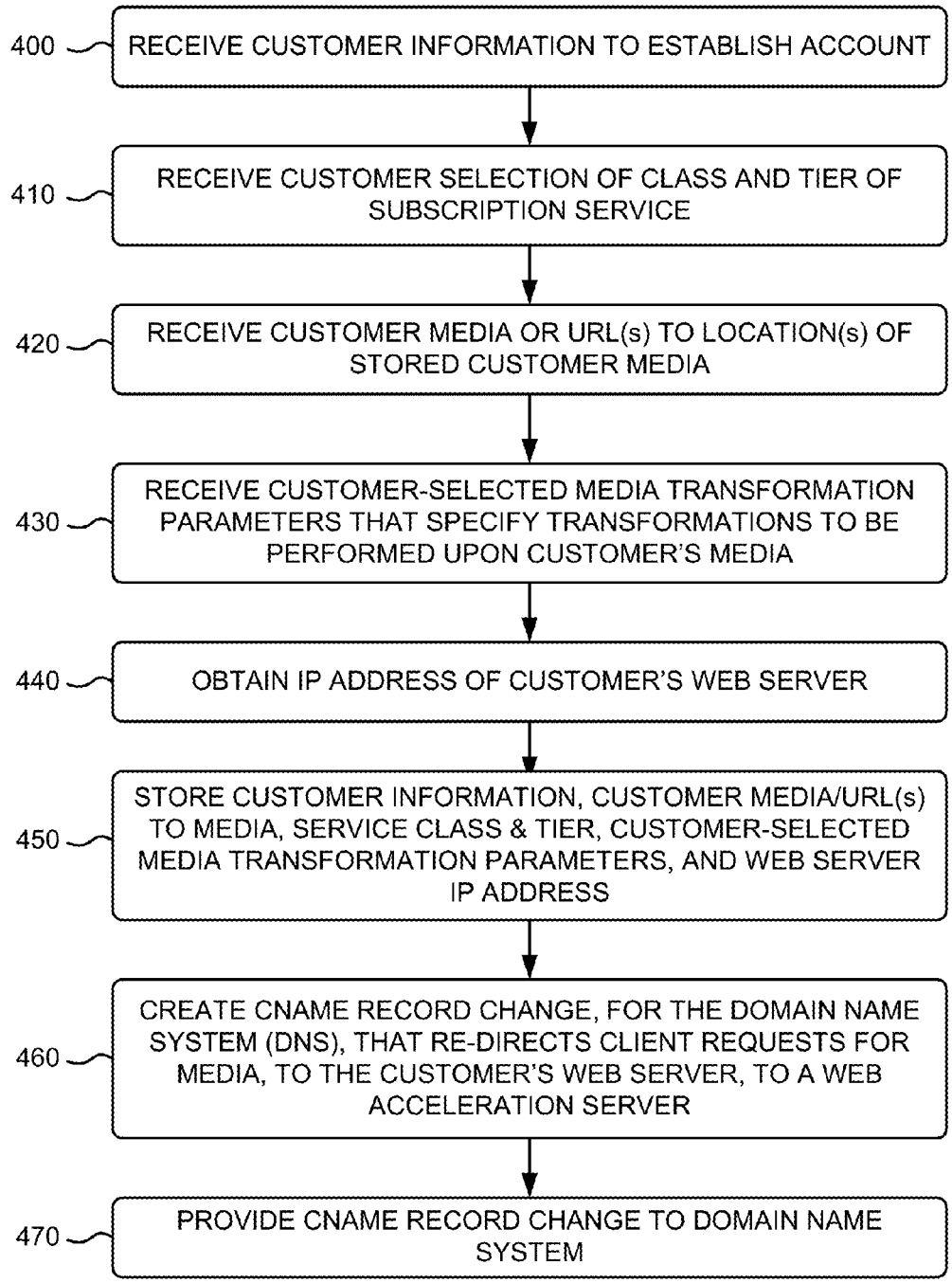
FIG. 4 is a flow diagram that illustrates an exemplary process for customer subscription to a content delivery network media transformation service.

FIG. 4 is a flow diagram that illustrates an exemplary process for customer subscription to a CDN media transformation service, including customer selection of a service class and/or service tier, provision of media location information, and customer-selection of specific media transformations. The exemplary process of FIG. 4 may be implemented by web acceleration server 120. The exemplary process of FIG. 4 is described below with reference to the diagrams of FIGS. 5-9.

Figure 5:
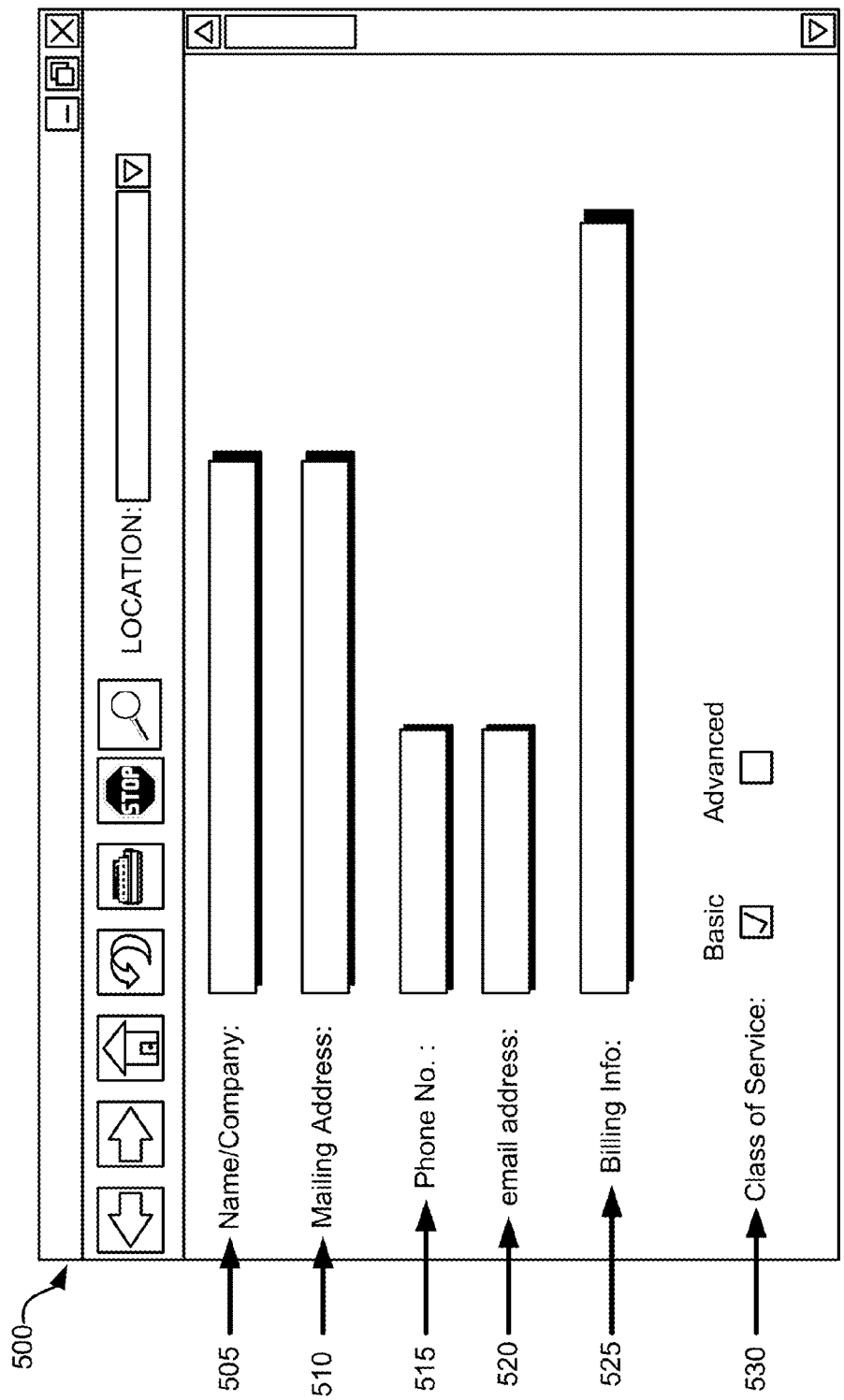
Figure 8:
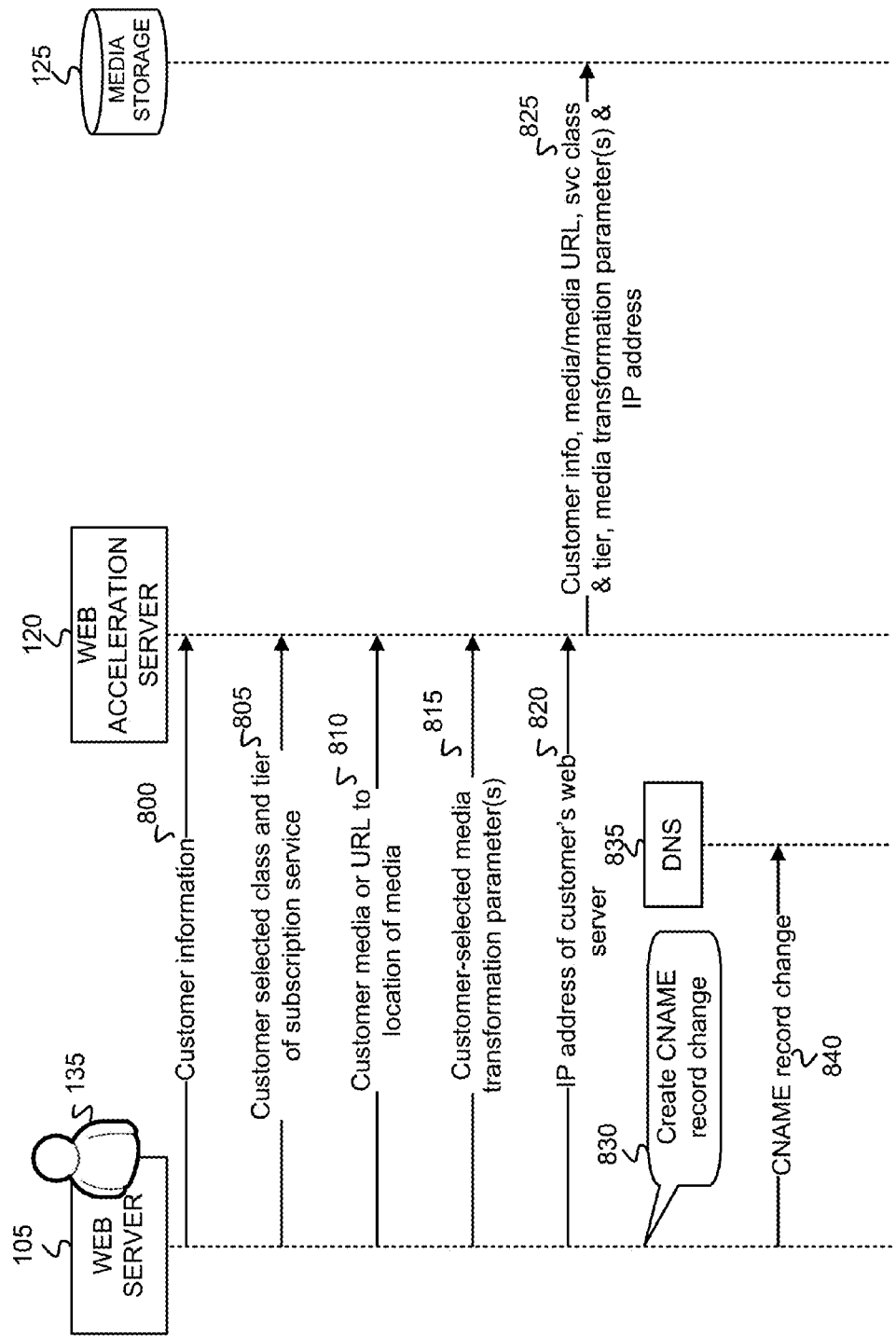
FIG. 8 is a diagram that depicts messaging associated with the exemplary process of FIG. 4.

The exemplary process may include web acceleration server 120 receiving customer information to establish an account (block 400). The customer information received from a customer 135 may include, for example, a name of customer 135 (personal or company), a mailing address or a billing address, a phone number, an email address, and/or billing information (e.g., bank information, credit card information, PayPal account information, etc.). An example user interface 500, as shown in FIG. 5, permits customer 135 to provide the customer information for establishing the account via web server 105 or via another device that may present user interface 500 (e.g., a laptop or desktop computer, a cellular "smart" phone, etc.). User interface 500 may include various data entry fields 505-525 that enable customer 135 to enter the customer information. Data entry field 505 permits customer 135 to enter his/her name and/or the company name associated with the corresponding web server 105. Data entry field 510 permits customer 135 to enter a mailing address of customer 135, and data entry field 515 permits customer 135 to enter a phone number. Data entry field 520 permits customer 135 to enter an email address for receiving emails regarding the account, and data entry field 525 permits customer 135 to enter specific billing information to enable the billing of customer 135 for usage of the media transformation service described herein. The messaging diagram of FIG. 8 depicts customer 135 sending customer information 800 from web server 105 to web acceleration server 120.

Web acceleration server 120 receives a customer selection of a class and tier of subscription service (block 410). Certain media transformations may be associated with each different class of service. The different tiers of service within each class include different data transfer and storage maximums based on different setup fees and monthly fees. Referring again to the example user interface 500 of FIG. 5, customer 135 may select (e.g., mouse-over and "click") on a class of service 530, which in this example include either a "basic" or "advanced" class of service available for the media transformation service. In other implementations, however, more than two different classes of service may be available to customer 135.

If customer 135 selects the "basic" class of service via user interface 500, then a subsequent user interface 600 may be presented that permits customer 135 to select from multiple different tiers of service within the "basic" class of service. For example, as shown in user interface 600 of FIG. 6, seven different tiers of service 610 may be available within the "basic" class of service, where each tier includes a maximum number of images (or other media) served per each month, a maximum amount of data transferred per each month, and a maximum amount of data storage used per month for a certain setup fee, and monthly fee. Each tier of service additionally includes specified overage fees 630 that are charged to customer 135 when the maximums set by the tier of service are exceeded. For example, referring to FIG. 6, if customer 135 selects a tier 1 620 of service, then, for a setup fee of $750 and a monthly fee of $250, customer 135 can have a maximum of 200,000 images (or other media) served per month, a maximum of 5 Gigabytes (GB) of data transferred per month, and a maximum of 2 GB stored per month. As further shown in the overage fees section 630 of user interface 600, if customer 135 exceeds the maximums, then customer 135 will pay $0.0010 per image (or other media) served in excess of the tier 1 maximum, $50 per 5 GB of data transferred in excess of the tier 1 maximum, and $10 per 5 GB of data stored in excess of the tier 1 maximum.

If customer 135 selects the "advanced" class of service via user interface 500, then a subsequent user interface 700 may be presented that permits customer 135 to select from multiple different tiers of service within the "advanced" class of service. For example, as shown in user interface 700 of FIG. 7, seven different tiers of service 710 may be available within the "advanced" class of service, where each tier includes a maximum number of images (or other media) served per each month, a maximum amount of data transferred per each month, and a maximum amount of data storage used per month for a certain setup fee, and monthly fee. Each tier of service additionally includes specified overage fees 730 that are charged to customer 135 when the maximums set by the tier of service are exceeded. For example, referring to FIG. 7, if customer 135 selects a tier 1 720 of service, then, for a setup fee of $3,000 and a monthly fee of $1,000, customer 135 can have a maximum of 200,000 images (or other media) served per month, a maximum of 5 GB of data transferred per month, and a maximum of 2 GB of data stored per month. As further shown in the overage fees section 730 of user interface 700, if customer 135 exceeds the maximums, then customer 135 will pay $0.00150 per image (or other media) served in excess of the tier 1 maximum, $50 per 5 GB of data transferred in excess of the tier 1 maximum, and $10 per 5 GB of data stored in excess of the tier 1 maximum. The messaging diagram of FIG. 8 depicts customer 135 sending a customer selected class and tier of subscription service 805 from web server 105 to web acceleration server 120.

Web acceleration server 120 receives specific customer media, or a URL(s), to a network location(s) of the stored customer media (block 420). The URL(s) associated with customer media may identify a location(s) where the customer media is stored at web server 105, or a network location where the customer media is stored at an external storage site. As an alternative to providing the URL(s) associated with the network location(s) of the customer media, customer 135 may provide the customer media itself (e.g., the image(s), audio media, video media, etc.). FIG. 8 depicts customer 135 sending the customer media 810, or URL(s) to a location of the customer media, from web server 105 to web acceleration server 120.

Figure 9:
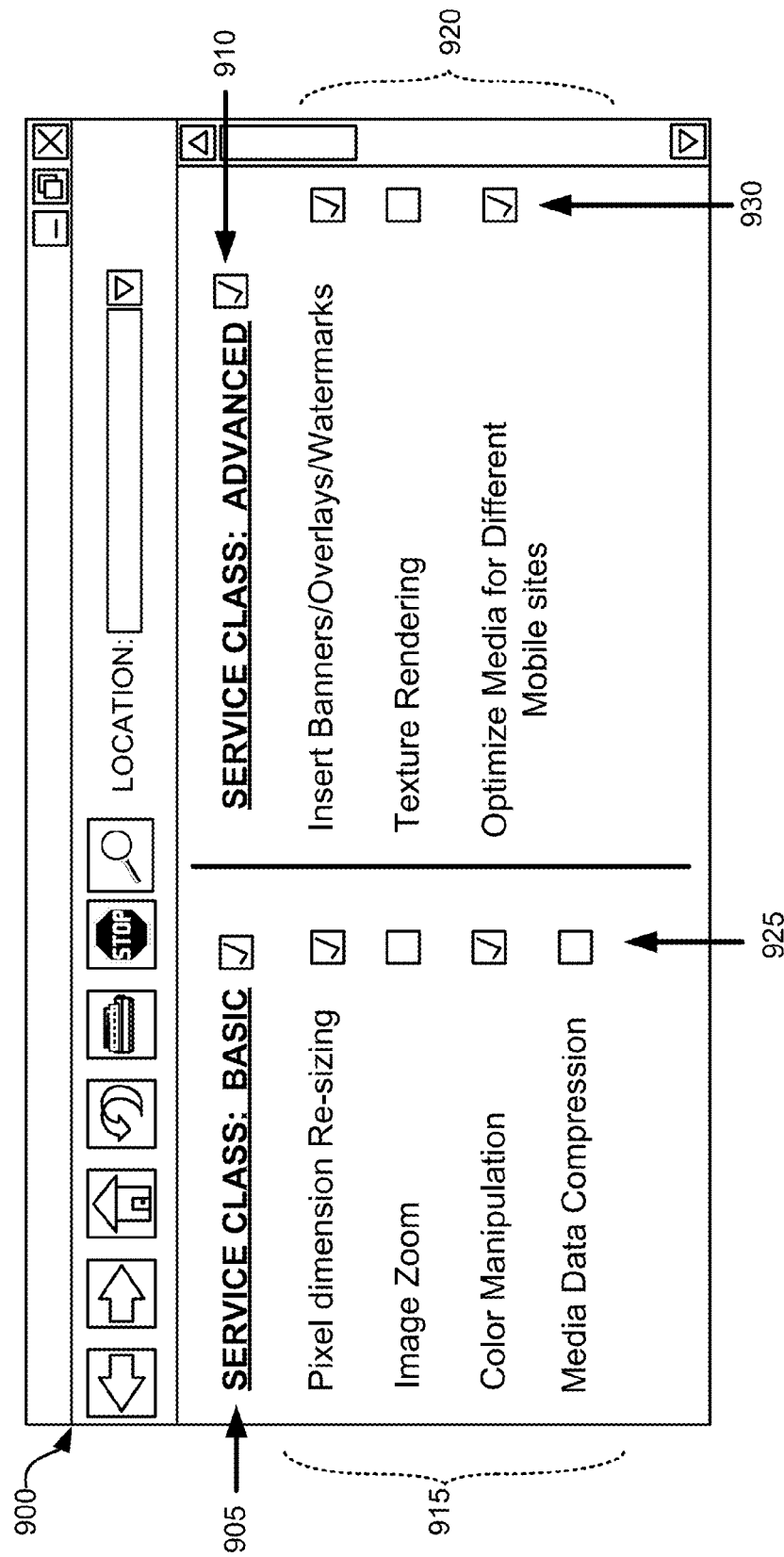

Web acceleration server 120 receives customer-selected media transformation parameters that specify transformations to be performed upon the customer's media (block 430). Customer 135, either via web server 105 or via another device (e.g., a desktop or laptop computer, a cellular "smart" phone, etc.) selects one or more different media transformations that customer 135 desires to have performed upon the customer media of block 420. If a "basic" class of service has been selected, then customer 135 may select one or more of the following media transformations: resizing to different pixel dimensions, image zooming, color manipulation, and/or data compression. If an "advanced" class of service has been selected, then customer 135 may select one or more of the "basic" media transformations, but may additionally select one or more of the following "advanced" media transformations: insertion of banners/overlays/watermarks, rendering textures, and/or optimizing the media for various different sites (e.g., for a mobile site). For each selected media transformation that the customer 135 selects, corresponding media transformation parameters are generated that specify the media transformation(s) to be performed. FIG. 9 depicts an example user interface 900 that may be used by customer 135 for selecting specific media transformations to be performed upon customer media. For example, as shown in the "basic" service class segment 905 of user interface 900, multiple different media transformations 915 may each be selected by checking a corresponding "check box" 925. In the example shown in FIG. 9, the "basic" service class may include pixel dimension re-sizing, image zoom, color manipulation and/or media data compression. Customer 135 may, therefore, select one or more of the media transformation shown under the "basic" service class segment 905 of user interface 900. As additionally shown in FIG. 9, an "advanced" service class segment 910 of user interface 900 may present multiple different media transformations 920 that may each be selected by customer 135 by checking a corresponding "check box" 930. In the example shown in FIG. 9, the "advanced" service class may include banner/overlay/watermark insertion, texture rendering and/or optimizing media for different sites (e.g., different mobile sites) of different destination devices. Upon selection of one or more media transformations from segment 905 and/or segment 910 of user interface 900, appropriate media transformation parameters are generated, that specify the selected media transformations and include any appropriate dimensions associated with the media transformations. The messaging diagram of FIG. 8 depicts customer 135 sending customer-selected media transformation parameters 815 to web acceleration server 120.

Web acceleration server 120 obtains an IP address of the customer's web server 105 (block 440). As shown in FIG. 8, customer 135 may send the IP address 820 of the customer's web server 105 from web server 105 to web acceleration server 120. Web acceleration server 120 stores the customer media/URL(s) to the media, the service class and tier, the customer-selected media transformation parameters, and the web server IP address in media storage 125 (block 450). Web acceleration server 120 stores the customer information in field 305, the customer media/URL(s) to the customer media in field 310, the selected service class in field 315, the selected service tier in field 320, the customer-selected media transformation parameters in field 325, and the IP address of web server 105 in field 330 of media storage 125. FIG. 8 depicts web acceleration server 120 storing 825 the customer information, media and/or media URL(s), the service class and tier, the media transformation parameter(s), and the IP address in media storage unit 125.

Web acceleration server 120 creates a CNAME record change, for the Domain Name System (DNS), that cause the re-direction of client requests for media, originally sent to the customer's web server 105, to a web acceleration server 120 (block 460). A CNAME record, in the DNS system, stands for "Canonical Name" record and includes a resource record that specifies that a domain name is an "alias" for another domain. For example, a server that stores on-line images may be accessible via the URL "img.examples.com." If a CNAME record is created that points "images.examples.com" to "img.examples.com," then the DNS can re-direct any request for "images.example.com" to "img.example.com." The CNAME record created in block 460 may, therefore, re-direct client requests to web server 105 to a particular one of web acceleration servers 120-1 through 120-m. Web acceleration server 120 provides the CNAME record change to the Domain Name System (block 470). Blocks 460 and 470 have been described as being performed by web acceleration server 120 in response to receiving customer media information, including customer-selected media transformation parameters. In other implementations, however, blocks 460 and 470 may be performed by the customer 135 themselves, either via the customer's web server 105 or via another computing device (e.g., desktop or laptop computer, or cellular "smart" phone, of the customer 135). For example, FIG. 8 depicts customer 135 at web server 105 creating 830 a CNAME record change, and web server 105 sending the CNAME record change 840 to the DNS system 835.

Blocks 420 through 450, instead of the entirety of the process of FIG. 4, may be selectively repeated each time a customer 135 desires to designate new media for media transformation, and to select specific media transformations to be applied to the new media, by web acceleration server 120, when the media is served to a client 140. Blocks 420 through 450 may also be repeated each time a customer 135 desires to change the media transformations to be applied to certain media already previously designated for media transformation.

Figure 10:
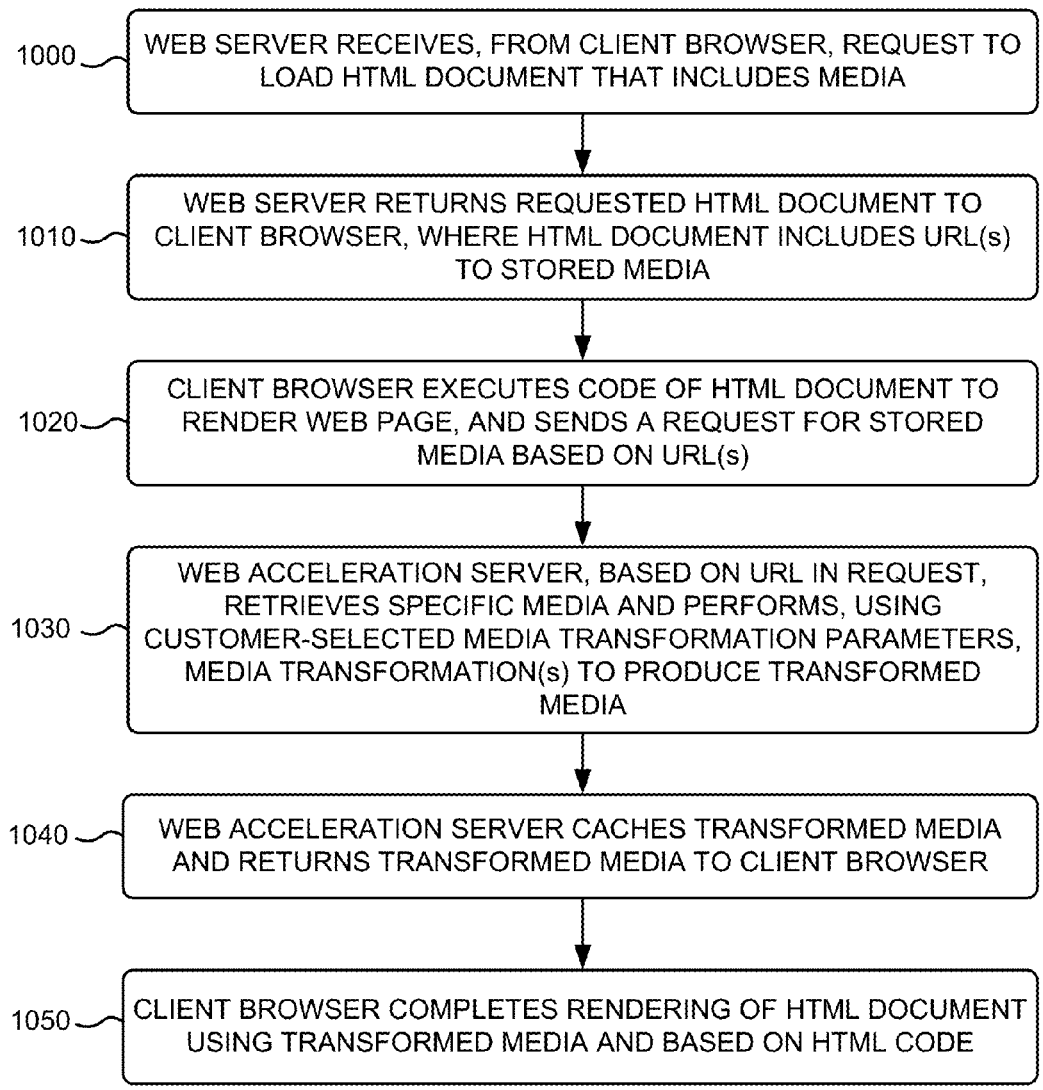
FIG. 10 is a flow diagram that illustrates an exemplary process for performing media transformations upon client requested media based on customer-selected media transformation parameters.

FIG. 10 is a flow diagram that illustrates an exemplary process for performing media transformations upon client requested media based on customer-selected media transformation parameters. The exemplary process of FIG. 10 may be implemented by web server 105, device 110, and web acceleration server 120. The exemplary process of FIG. 10 is described below with reference to the diagrams of FIGS. 11 and 12.

Figure 11:
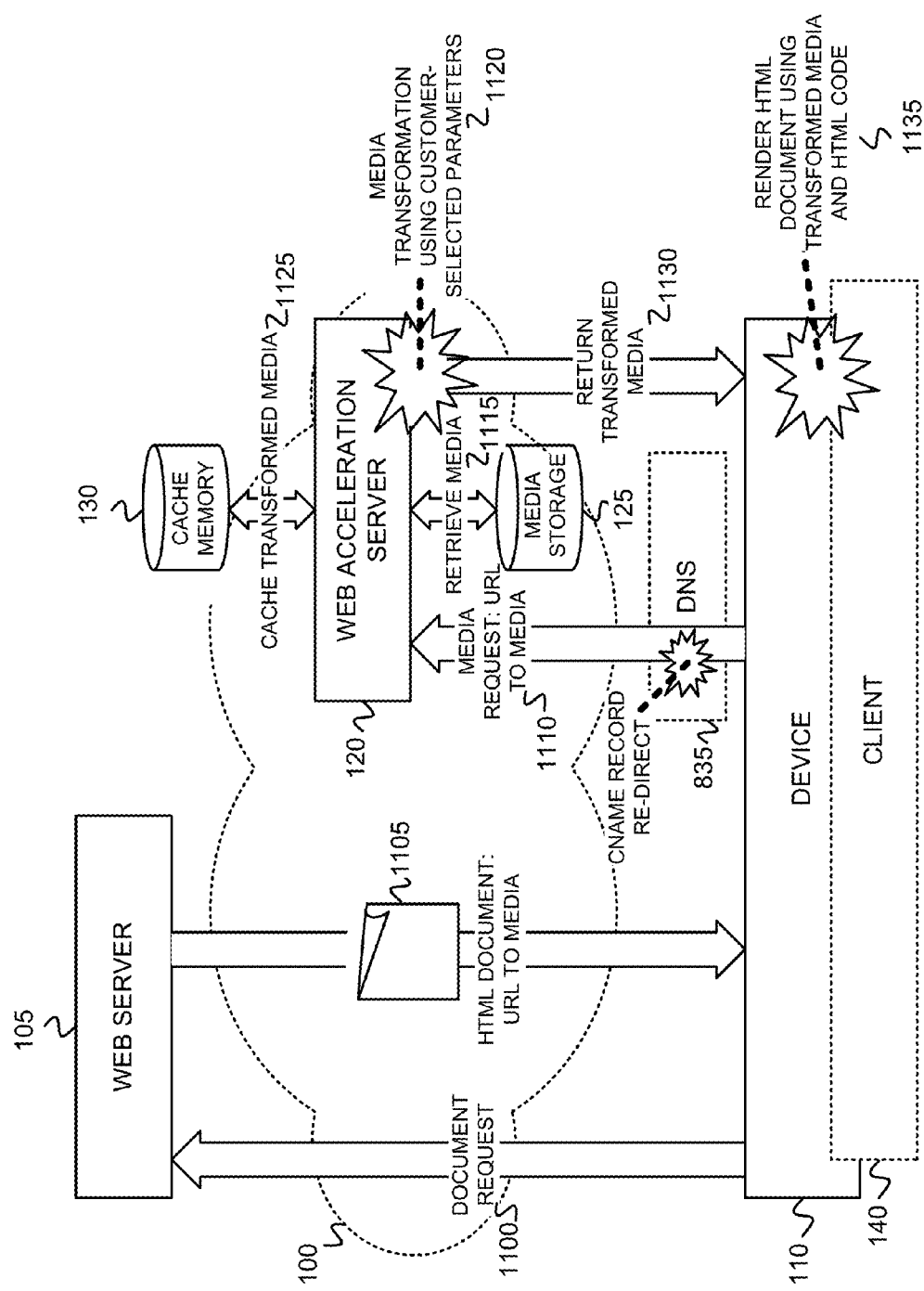
FIG. 11 is a diagram that depicts messaging associated with the exemplary process of FIG. 10.

The exemplary process may include web server 105 receiving, from a client 140 (e.g., a client web browser) executing at a device 110, a request to load a HTML document that includes particular customer media (block 1000). As shown in FIG. 11, client 140 at device 110 sends a document request 1100 to web server 105 via CDN 100. Web server 105 returns the requested HTML document to the client 140, where the HTML document includes a URL(s) to stored media (block 1010). The code of the HTML document may include, in a case where the media is an image, an "img" HTML tag, with an HTML "src" attribute that specifies a location of the image, using a URL, for retrieval. Thus, the code of the HTML document may include, for each image to be presented in the rendered document at client 140, an HTML tag and attribute in the following form "img src <URL>". As shown in FIG. 11, in response to receipt of document request 1100, web server 105 returns, via CDN 100, an HTML document 1105 that includes the URL identifying the location of the item or items of media to be presented in the rendered version of HTML document 1105.

Client 140, at device 110, executes the code of the HTML document to render the corresponding web page, and sends a request for stored media based on the URL(s) included in the HTML document (block 1020). For example, if the media indicated in the HTML document is an image, client 140 retrieves the URL from the HTML "src" attribute within the HTML document, and sends a request for the media. As shown in FIG. 11, the media request 1110, via action of the DNS system 835, re-directs the media request, based on the CNAME record change created in blocks 460 and 470, from web server 105 (which has a network address that originally corresponds to the URL contained in the HTML "src" attribute) to web acceleration server 120.

Figure 12:
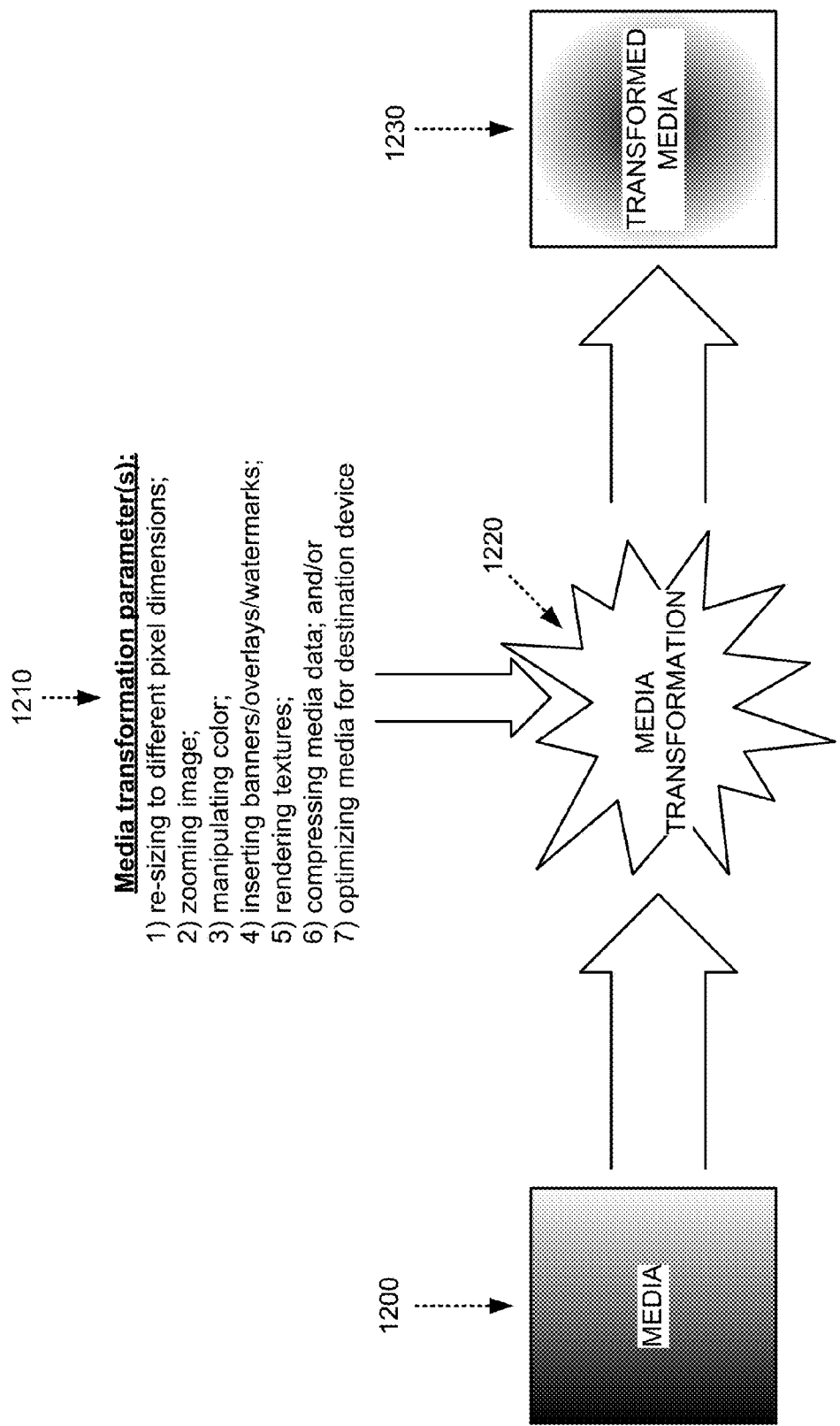
FIG. 12 is a diagram that depicts an example of one or more media transformations being performed upon an item of customer media.

Web acceleration server 120, based on the URL(s) contained in the request for the stored media, retrieves the specific media and performs, using customer-selected media transformation parameters, media transformations to produce transformed media (block 1030). Web acceleration server 120, based on the URL(s) contained in the received request for media, obtains the media to be transformed, and retrieves the media transformation parameter(s) from field 325 of media storage. Web acceleration server 120 may retrieve the customer media directly from field 310 of an entry 300 of media storage 125, or may retrieve the URL(s) of the media from field 310 of the entry 300 of media storage 125, and then retrieve the media from the network location corresponding to the retrieved URL(s). FIG. 11 depicts web acceleration server 120 retrieving 1115 the customer media from media storage 125, and then transforming 1120 the media using the customer-selected media transformation parameters. FIG. 12 further depicts an example of the transformation of customer media 1200. As shown, media transformation parameter(s) 1210 may specify one or more media transformation operations, including: 1) re-sizing to different pixel dimensions; 2) zooming the image(s); 3) manipulating the color of the media; 4) inserting banners, overlays and/or watermarks into the media; 5) rendering textures; 6) compressing media data; and/or 7) optimizing the media for the destination device. The media transformation parameter(s) 1210 may be used, in a media transformation operation 1220 to transform the initial media 1200 to a transformed version 1230 of the media.

Web acceleration server 120 caches the transformed media, and returns the transformed media to the requesting client 140 at device 110 (block 1040). FIG. 11 depicts web acceleration server 120 storing the transformed media 1125 in cache memory 130, and then returning 1130 the transformed media to client 140 at device 110 via CDN 100. Client 140, at device 110, completes the rendering of the HTML document using the transformed media and based on the HTML code of the HTML document (block 1050). As shown in FIG. 11, upon receipt of the transformed media 1130 from web acceleration server 120, client 140 at device 110 renders 1135 the HTML document, using the received transformed media, and the HTML code of the HTML document.

Figure 13:
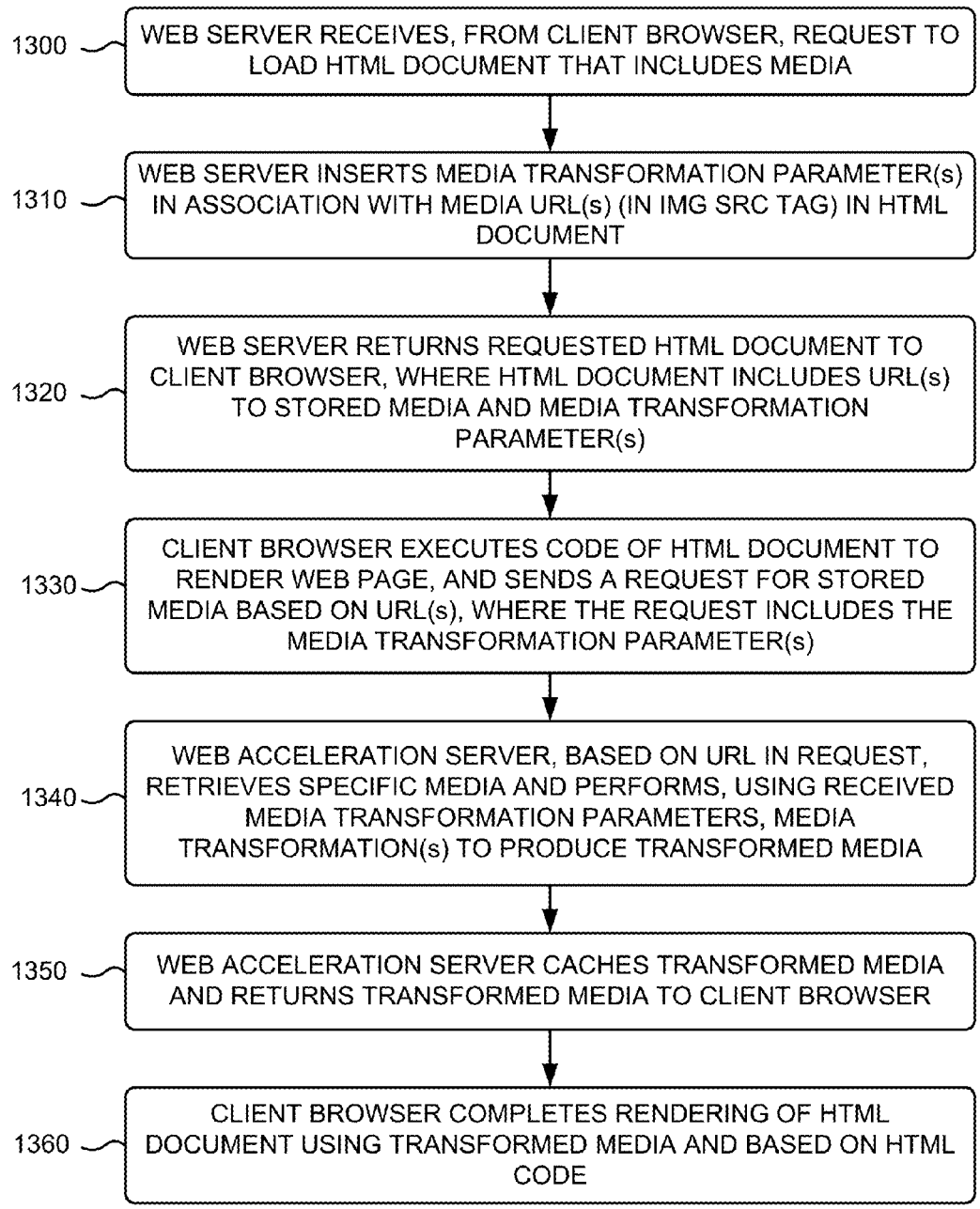
FIG. 13 is a flow diagram that illustrates an exemplary process for performing media transformations upon client requested media based on parameters inserted into a Hypertext Markup Language document by a web server.

FIG. 13 is a flow diagram that illustrates an exemplary process for performing media transformations upon client requested media based on parameters inserted into a HTML document by a web server 105 that, when rendered, contain the client requested media. The exemplary process of FIG. 13 may be implemented by web server 105, client 140 at device 110, and web acceleration server 120. The exemplary process of FIG. 13 is described below with reference to the diagram of FIG. 14.

Figure 14:
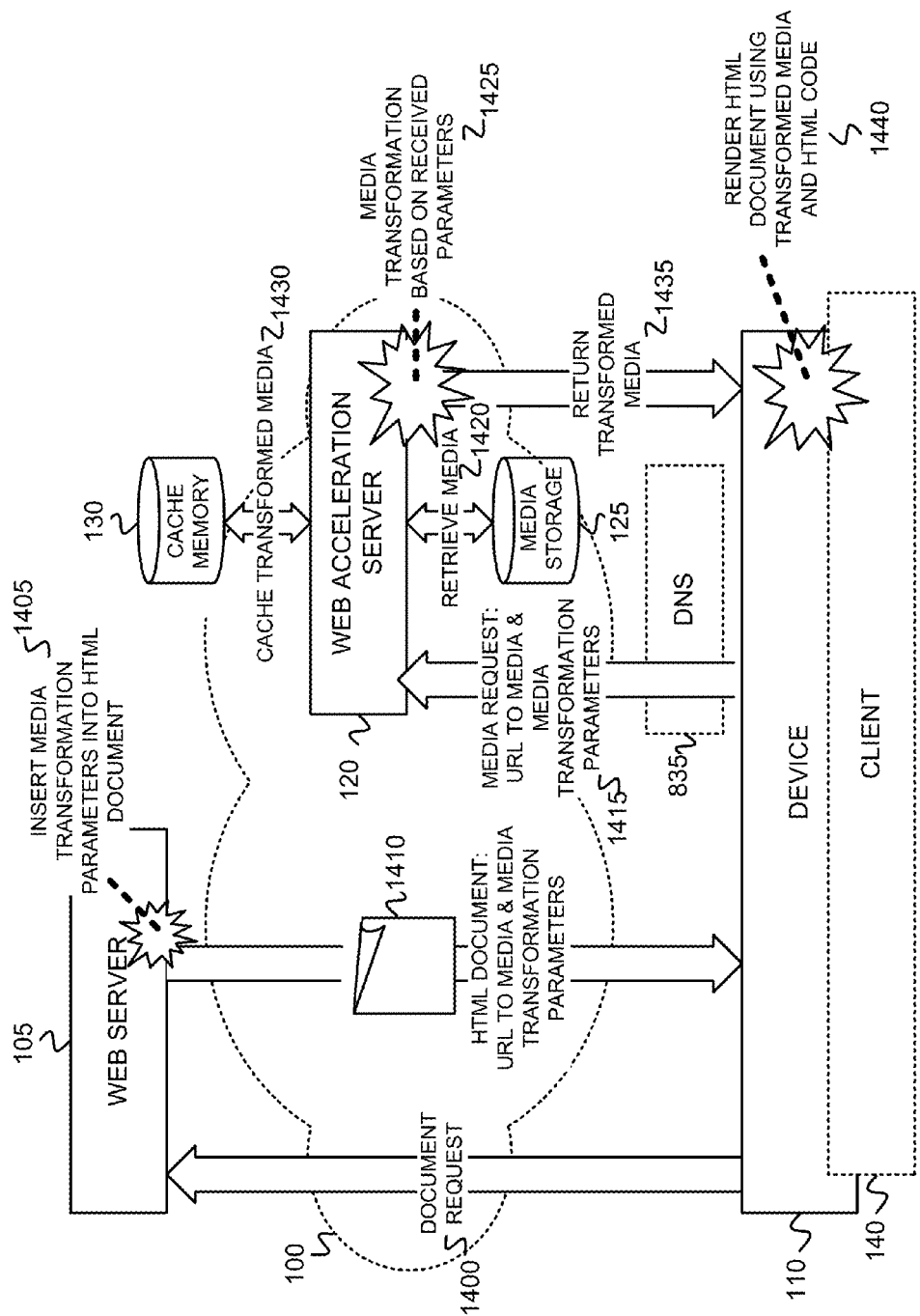
FIG. 14 is a diagram that depicts messaging associated with the exemplary process of FIG. 13.

The exemplary process may include web server 105 receiving, from a client 140 (e.g., a client web browser) executing at a device 110, a request to load a HTML document that includes particular customer media (block 1300). As shown in FIG. 14, client 140 at device 110 sends a document request 1400 to web server 105 via CDN 100. Web server 105 inserts one or more media transformation parameters in association with media URL(s) in the HTML document (block 1310). For example, the code of the HTML document may include, in a case where the media is an image, an "img" HTML tag, with an HTML "src" attribute that specifies a location of the image, using a URL, for retrieval. Thus, the code of the HTML document may include, for each image to be presented in the rendered document at client 140, an HTML tag and attribute in the following form "img src <URL>". In association with each media URL in the HTML document, web server 105 may insert one or more media transformation parameters that indicate the one or more media transformations to be performed upon the media of the associated media URL. The one or more customer-selected media transformation parameters for the particular customer media may be "pushed" from web acceleration server 120 to web server 105, or may be "pulled" by web server 105 from web acceleration server 120. FIG. 14 depicts web server 105 inserting 1405 media transformation parameters into the HTML document.

Web server 105 returns the requested HTML document to the client 140, where the HTML document includes a URL(s) to stored media and the one or more media transformation parameters associated with each URL(s) (block 1320). FIG. 14 depicts web server 105 sending a HTML document 1410 to client 140 at device 110 via CDN 100, where HTML document 1410 includes a URL(s) to media, and one or more media transformation parameters inserted into HTML document 1410 in associated with each URL(s).

Client 140, at device 110, executes the code of the HTML document to render the corresponding web page, and sends a request for stored media based on the URL(s) included in the HTML document, where the request includes the one or more received media transformation parameters (block 1330). As shown in FIG. 14, client 140 at device 110 sends a media request 1415, where the request 1415 includes the URL(s) to media and the media transformation parameters received in the HTML document. Media request 1415, when originated at client 140, may be sent to a network address associated with web server 105. However, via action of the DNS 835, and based on a previously received CNAME record change, DNS 835 may re-direct media request 1415 from web server 105 to web acceleration server 120.

Web acceleration server 120, based on the URL(s) contained in the request for the stored media, retrieves the specific media and performs, using the received one or more media transformation parameters, media transformations to produce transformed media (block 1340). Web acceleration server 120, based on the URL(s) contained in the received request for media, obtains the media to be transformed. Web acceleration server 120 may retrieve the customer media directly from field 310 of an entry 300 of media storage 125, or may retrieve the URL(s) of the media from field 310 of the entry 300 of media storage 125, and then retrieve the media from the network location corresponding to the retrieved URL(s). FIG. 14 depicts web acceleration server 120 retrieving 1420 the customer media from media storage 125, and then transforming 1425 the media based on the received media transformation parameters. The media transformation(s) may occur similarly to that shown, and described with respect to, FIG. 12 above.

Web acceleration server 120 caches the transformed media, and returns the transformed media to the requesting client 140 at device 110 (block 1350). FIG. 14 depicts web acceleration server 120 storing the transformed media 1430 in cache memory 130, and then returning 1435 the transformed media to client 140 at device 110 via CDN 100. Client 140, at device 110, completes the rendering of the HTML document using the transformed media and based on the HTML code of the HTML document (block 1360). As shown in FIG. 14, upon receipt of the transformed media 1435 from web acceleration server 120, client 140 at device 110 renders 1440 the HTML document, using the received transformed media, and the HTML code of the HTML document.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4, 10 and 13, the order of the blocks may be varied in other implementations. Moreover, non-dependent blocks may be performed in parallel. Some embodiments have been described herein with respect to media that includes HTTP Live Streaming (HLS) media. However, the principles described herein may be applied to Smooth Streaming or Adaptive Bit Rate Streaming media.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
configuring a network device in a content delivery network (CDN) with a plurality of visual presentation transformations the network device selectively applies during distribution of customer media, with application of each visual presentation transformation of the plurality visual presentation transformations changing presentation of the customer media on a display by changing a different visual property of the customer media;
receiving, at the network device from the customer, data associated with original customer media, wherein rendering the original customer media produces a first presentation on the display;
receiving, at the network device from the customer originating the original customer media, selection of a subset of visual presentation transformations from the plurality of media transformations that are to be applied to the original customer media prior to delivery;
receiving, at the network device from a client browser, a request for the original customer media;
applying, at the network device responsive to receipt of the request for the original customer media from the client browser, the subset of visual presentation transformations to the original customer media based on the selection of the subset of visual presentation transformations by the customer, wherein said applying generates modified customer media producing a second presentation on the display that is different than the first presentation of the original customer media; and
sending, from the network device to the client browser, the modified customer media in response to said request for the original customer media.

2. The method of claim 1, wherein the data associated with the original customer media comprises a Uniform Resource Locator (URL) associated with a network location of the original customer media.

3. The method of claim 1, wherein the data associated with the original customer media comprises the original customer media itself.

4. The method of claim 1, wherein the original customer media comprises one or more images, audio media, video media, or audio and video media.

5. The method of claim 1, further comprising:
storing, in a data structure, the customer subscription, the data associated with the original customer media and the selection of the subset of visual presentation transformations.

6. The method of claim 5, further comprising:
retrieving, from the data structure responsive to receiving the request for the original customer media, the data associated with the original customer media, and the selection of the subset of visual presentation transformations; and
obtaining the original customer media,
wherein said applying comprises:
transforming the original customer media based on the retrieved selection of the subset of visual presentation transformations.

7. The method of claim 1, wherein the request for the original customer media is received at the network device from the client browser based on the client browser executing code of a Hypertext Markup Language (HTML) document.

8. The method of claim 1, wherein said applying comprises resizing the original media content from a first size in the first presentation to a different second size in the second presentation of the modified media content in response to application of a particular visual presentation transformation from the subset of visual presentation transformations to the original media content.

9. The method of claim 1, wherein said applying comprises zooming into or out from the original media content in response to application of a particular visual presentation transformation from the subset of visual presentation transformations.

10. The method of claim 1, wherein said applying comprises manipulating color of the original media content in response to application of a particular visual presentation transformation from the subset of visual presentation transformations.

11. The method of claim 1, wherein said applying comprises inserting one or more of a banner, overlay, or watermark into the original media content in response to application of a particular visual presentation transformation from the subset of visual presentation transformations.

12. The method of claim 1 further comprising receiving a request for a base page comprising an original link to the original media content, and sending, responsive to receipt of the request for the base page, a modified base page with the original link replaced with a modified link, the modified link linking to the original media content and specifying the subset of visual presentation transformations to apply to the original media content.

13. The method of claim 12, wherein said receiving the request for the original customer media comprises receiving a request comprising the modified link and retrieving the original customer media and the subset of visual presentation transformations based on the modified link specifying the subset of visual presentation transformations to apply to the original media content.

14. A network device, comprising:
a communication interface configured to connect to a content delivery network (CDN), and to:
receive, from a customer, data associated with original customer media, wherein rendering the original customer media produces a first presentation on a display,
receive, from the customer originating the customer media, selection of a subset of visual presentation transformations from a plurality of visual presentation transformations to be applied to the original customer media prior to delivery, wherein application of each visual presentation transformation of the plurality visual presentation transformations changes presentation of the customer media on the display by changing a different visual property of the customer media, and
receive, from a client browser, a request for the original customer media; and
a processing unit configured to:
apply, responsive to receipt of the request for the original customer media, the subset of visual presentation transformations to the original customer media based on the selection of the subset of visual presentation transformations by the customer, wherein said applying generates modified customer media producing a second presentation on the display that is different than the first presentation of the original customer media,
cause the modified customer content to be sent, via the communication interface and the CDN, to the client browser,
transform, responsive to receipt of a request from the client browser comprising a particular modified link of one or more modified links, a particular element forming part of the customer media to produce a transformed version of the particular element based on the particular modified link referencing the particular element and one or more customer selected parameters with which to change the particular element, and
cause the transformed version of the particular element to be sent, via the communication interface and the CDN, to the client browser.

15. The network device of claim 14, wherein the data associated with the original customer media comprises a Uniform Resource Locator (URL) associated with a network location of the original customer media.

16. The network device of claim 14, wherein the data associated with the original customer media comprises the customer media itself.

17. The network device of claim 14, wherein the original customer media comprises one or more images, audio media, video media, or audio and video media.

18. The network device of claim 14, wherein the processing unit is further configured to:
cause the data associated with the original customer media and the selection of the subset of visual presentation transformations to be stored in a data structure.

19. The network device of claim 14, wherein the request for the original customer media is received at the network device from the client browser based on the client browser executing code of a Hypertext Markup Language (HTML) document.

20. A non-transitory storage medium storing instructions executable by a computational device, wherein the instructions comprise instructions to:
receive, from a customer, data associated with customer media originated by said customer, wherein the data associated with the original customer media comprises a Uniform Resource Locator (URL) associated with a network location of the original customer media, or comprises the original customer media itself;

receive, from the customer originating the customer media, one or more customer-selected parameters activating a subset of media transformations from a plurality of media transformations available at the computational device, wherein said activating comprises applying the subset of media transformations to the customer media before distributing the customer media to a requesting client;

receive, from a client browser, a request for the customer media;

apply, at the computational device responsive to receipt of the request for the customer media from the client browser, the subset of media transformations to the customer media based on the customer activating the subset of media transformations with the one or more customer-selected parameters, wherein said applying produces a transformed version of the customer media prior to distributing the customer media in response to the request; and cause the transformed version of the customer media to be sent, from the computational device to the client browser.

* * * * *